US006970574B1

(12) United States Patent
Johnson

(10) Patent No.: US 6,970,574 B1
(45) Date of Patent: *Nov. 29, 2005

(54) PATTERN RECOGNITION SYSTEM AND METHOD FOR MONITORING HAND WASHING OR APPLICATION OF A DISINFECTANT

(76) Inventor: Raymond C. Johnson, 337 Penhurst Pl., Chesterfield, MO (US) 63017

( * ) Notice: Subject to any disclaimer, the term of this patent is extended or adjusted under 35 U.S.C. 154(b) by 649 days.

This patent is subject to a terminal disclaimer.

(21) Appl. No.: 10/096,061

(22) Filed: Mar. 12, 2002

Related U.S. Application Data

(60) Provisional application No. 60/275,495, filed on Mar. 13, 2001.

(51) Int. Cl.⁷ .............................................. G06K 9/00
(52) U.S. Cl. ...................... 382/100; 382/107; 348/143; 134/57 R
(58) Field of Search ................. 382/100, 103, 382/107, 108, 115, 151, 163, 173, 178, 180, 382/209, 237, 274, 312, 321, 118, 305; 348/143, 348/619; 134/57 R–58 R, 18; 340/573.1; 356/73; 702/127; 222/1; 604/289, 290

(56) References Cited

U.S. PATENT DOCUMENTS

| | | | | | |
|---|---|---|---|---|---|
| 5,202,666 | A | * | 4/1993 | Knippscheer | ............ 340/573.1 |
| 5,952,924 | A | * | 9/1999 | Evans et al. | ............. 340/573.1 |
| 5,954,069 | A | * | 9/1999 | Foster | ....................... 134/57 R |
| 5,960,991 | A | * | 10/1999 | Ophardt | .......................... 222/1 |
| 6,038,331 | A |   | 3/2000 | Johnson | ....................... 382/100 |
| 6,122,042 | A | * | 9/2000 | Wunderman et al. | ......... 356/73 |
| 6,236,317 | B1 | * | 5/2001 | Cohen et al. | ............ 340/573.1 |
| 6,236,953 | B1 | * | 5/2001 | Segal | ........................... 702/127 |
| 6,292,575 | B1 | * | 9/2001 | Bortolussi et al. | ........... 382/118 |
| 6,392,546 | B1 | * | 5/2002 | Smith | ........................ 340/573.1 |
| 6,426,701 | B1 | * | 7/2002 | Levy et al. | ............... 340/573.1 |
| 2002/0000449 | A1 |   | 1/2002 | Armstrong | .................... 222/52 |

FOREIGN PATENT DOCUMENTS

| | | | |
|---|---|---|---|
| WO | WO 93/10311 | 5/1993 | ........... E03C 1/046 |
| WO | WO 01/33529 | 5/2001 | .......... G08B 21/00 |
| WO | WO 02/077927 | 10/2002 | ............. G07C 1/10 |

OTHER PUBLICATIONS

Serkan Hatipoglu, Sanjit K. Mitra and Nick Kingsbury, "Texture Classification Using Dual-Tree Complex Wavelet Transform," Image Processing and its Applications, Conference Publication No. 465 © IEE 1999.

L. Lucchese and S.K. Mitra, "Unsupervised Segmentation of Color Images Based on k-means Clustering in the Chromaticity Plane" © 1999 IEEE.

Yining Deng and B.S. Manjunath, "Unsupervised Segmentation of Color-Texture Regions in Images and Video," 2001.

* cited by examiner

Primary Examiner—Bhavesh M. Mehta
Assistant Examiner—Seyed Azarian
(74) Attorney, Agent, or Firm—Grace J. Fishel

(57) ABSTRACT

A system and method for monitoring hand washing or application of a disinfectant wherein a pattern recognition algorithm executed in a computer compares one or more digitized images of a person going through hand washing or disinfectant application motions with a reference set of images and creates a pass/fail report. The digitized image may be taken by a video camera and color quantified to reduce the amount of computing power required before clusters of pixels with similar color classifications are determined and shapes identified.

10 Claims, 1 Drawing Sheet

PATTERN RECOGNITION SYSTEM AND METHOD FOR MONITORING HAND WASHING OR APPLICATION OF A DISINFECTANT

The present application claims priority from provisional patent application 60/275,495, filed Mar. 13, 2001, which is incorporated by reference herein.

BACKGROUND OF THE INVENTION

1. Field of the Invention

The present invention relates to a system and method for monitoring hand washing or the application of a disinfectant to a user's hands through pattern recognition.

2. Brief Description of the Prior Art

In food service, food packing plants, medical care facilities and so forth, it is essential that the employee wash his or her hands properly and/or apply a disinfectant to prevent the spread of disease. The movements necessary to apply soap and wash one's hands or to apply a disinfectant and spread it on one's hands are well known, but ensuring that each employee practices them consistently continues to be a management problem.

U.S. Pat. No. 6,038,331 to Johnson for Apparatus and Method for Monitoring Hand Washing describes an effective system for monitoring the application of soap to a subject's hands. The present invention is an extension of the apparatus and systems described therein.

The following references are incorporated by reference herein: U.S. Pat. Nos. 6,038,331, 6,122,042 and 6,292,575; "Unsupervised Segmentation of Color-Texture Regions in Images and Video," Y. Deng and B. S. Manjunath; "Texture Classification Using Dual-Tree Complex Wavelet Transform," S. Hatipogiu, S. K. Mitra and N. Kingsbury, *Image Processing and Its Applications*, IEEE Conference Publication No. 465, 1999, 344–347; and "Unsupervised Segmentation of Color Images Based on k-means Clustering in the Chromaticity Plane," L. Lucchese and S. K. Mitra, 1999 IEEE, 74–78.

BRIEF SUMMARY OF THE INVENTION

In view of the above, it is an object of the present invention to provide a system and method for effectively monitoring whether hand washing and disinfectant application procedures are being practiced. It is another object to provide management with a report on its employees as to whether proper hand washing and disinfectant application procedures are being followed and to sound an immediate alert if desired, if they are not. Other objects and features of the invention will be in part apparent and in part pointed out hereinafter.

In accordance with the invention, a system for monitoring hand washing or spreading a disinfectant on a user's hands comprises:

a soap, detergent or disinfectant dispenser, said dispenser applying the soap, detergent or disinfectant to a user's hands, an optical input device in front of which a user places his or her hands after the dispenser has applied soap, detergent or disinfectant while the user goes through a set of motions of washing or spreading the disinfectant over his or her hands, said input device recording one or more optical images of the user's hands while he or she is going through said set of motions, a device for digitizing each of the optical images into a digitized image, a computer having an input for the digitized image and an output for a report, a set of reference optical images taken of the user or of another person going through a set of motions for effective hand washing or spreading of a disinfectant, said reference optical images digitized into a set of reference digitized images and present in the computer, a pattern recognition algorithm executed in the computer that compares each digitized image of the user's hands with the reference set of digitized images to determine whether the user's images match the reference images to a predetermined level that indicates effective hand washing or disinfectant spreading, and creates a report sent through the output.

A method for monitoring hand washing or spreading a disinfectant on a user's hands comprises:

having a user place his or her hands in front of a soap, detergent or disinfectant dispenser, said dispenser applying the soap, detergent or disinfectant to the user's hands, having the user place his or her hands in front of an optical input device after the dispenser has applied soap, detergent or disinfectant while the user goes through a set of motions of washing or spreading the disinfectant over his or her hands, said input device recording one or more optical images of the user's hands while he or she is going through said set of motions, digitizing each of the optical images into a digitized image, executing a pattern recognition algorithm in a computer having an input for the digitized image and an output for a report, said computer having a digitized set of reference optical images taken of the user or of another person going through a set of motions for effective hand washing or spreading of a disinfectant, said pattern recognition algorithm comparing each digitized image of the user's hands with the reference set of digitized images to determine whether the user's images match the reference images to a predetermined level that indicates effective hand washing or disinfectant spreading and creating a report sent through the output.

The invention summarized above comprises the system and method hereinafter described, the scope of the invention being indicated by the subjoined claims.

DETAILED DESCRIPTION OF THE INVENTION

Figure 1:
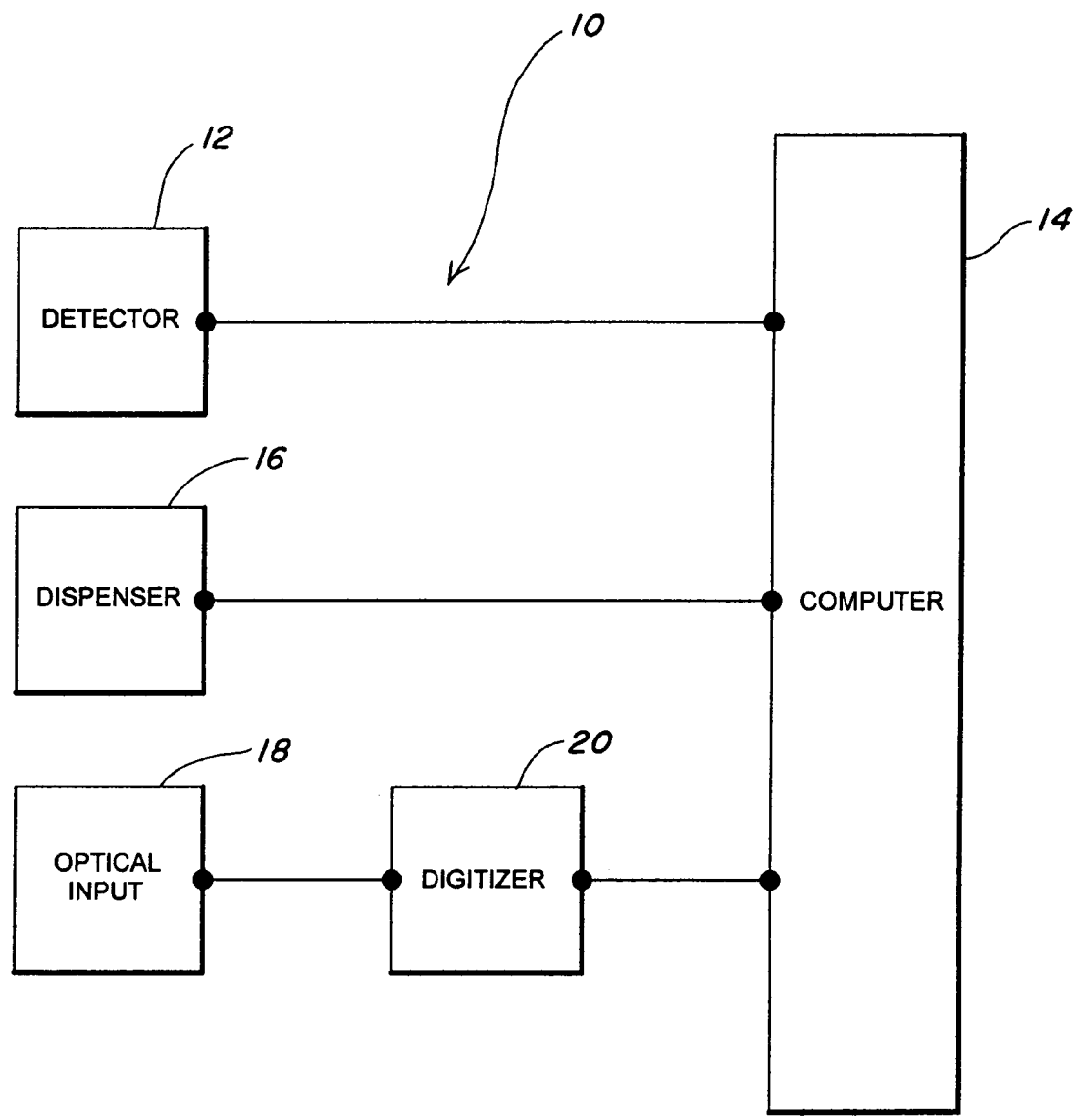
FIG. 1 is a schematic drawing of a system for practicing a method of monitoring hand washing or disinfectant application in accordance with the present invention.

For management purposes, it is important that an employer be assured that its employees are following proper procedures in hand washing and/or applying a disinfectant. There are systems that can identify an employee when he or she presents his or her hands under a soap, detergent or disinfectant dispenser, but this does not assure the employer that the employee has scrubbed his or her hands or spread the disinfectant in a proper manner. While the motions necessary for proper hand washing and disinfectant spreading are known and can be taught, it is not presently feasible for management to determine that the procedures are actually being followed. The present invention provides management with a system and method for determining that the proper techniques are practiced.

Referring to the drawings more particularly by reference character, reference numeral 10 refers to a system for monitoring hand washing and disinfectant application. An employee is identified by a detector 12 as he or she enters an area where he or she is required to wash his or her hands and/or apply a disinfectant. For this purpose, each employee may be outfitted with an optically scannable bar code or with an ID that can be read with a radio frequency transponder (RFID) or the like. Instead of a bar code or an ID, detector 12 may use face recognition technology or the like to identify the employee.

When the employee enters the room, detector 12 identifies the employee and sends a signal to a computer 14. A dispenser 16 applies soap, detergent or disinfectant to the user's hands. The dispenser may be touchless and have a proximity detector such that the soap, detergent or disinfectant is dispensed on the user's hands when they are within range. If the user is not an employee (i.e., not identified by the computer), the process will continue but a report may or may not be made to management on the anonymous user.

Computer 14 has a reference set of digitized optical images of a person going through a set of motions predetermined to be effective for proper hand washing or disinfecting of the person's hands. The images are held in the computer as a number of freeze frames of model stages in hand washing. This will allow, management to choose nail cleaning, for example if it desires, as part of a proper sequence. The reference set of images may be made from optical images of the user whose activity is to be monitored going through the proper motions or of some other person demonstrating the proper technique.

To obtain a passing report from the computer, the user must place his or her hands in front of an optical input device 18 after the soap, detergent or disinfectant has been applied and go through the motions of hand washing or spreading the disinfectant. Input device 18 records one or more optical images of the user's hands while he or she is going through the set of motions. Input device 18 may be a video camera such as a monochrome camera, a full color camera, or a camera that is sensitive to nonvisible portions of the spectrum. Optical images may be a set of grab frames. Input device 18 may also include a plurality of cameras for generating a three-dimensional image or a single camera with different objectives or filters for recording an image at different wavelengths, e.g., visible, IR or UV. Input device 18 may be visible to the user or hidden behind a one-way mirror or the like.

A device 20 is provided for digitizing each of the optical images of the user into a set of digitized images, which are then provided to computer 14. While shown separately, it will be understood that digitizer 20 may be an integral part of computer 14 or may be integrated directly into input device 18.

Computer 14 is programmed with a pattern recognition algorithm which is executed in the computer that compares each digitized image of the user's hands with the reference set of digitized images. The algorithm may include motion detector software capable of detecting differences between successive grab frames indicating movement. It will also be understood that the invention may make use of trained pattern recognition technologies such as neural networks. Trained pattern recognition systems may require less computing power and permit the use of lower cost microprocessors because the resulting algorithm created by a neural network program may be only a few lines of code.

The reference feature being compared in the computer may be color. When optical input device is a 24-bit RGB (red, green, blue) video camera, the color of each pixel is defined by intensities of the red, green and blue components in the range 0 to 255. To reduce the amount of computing power required, the pixels may be color quantified into a more manageable set of 8 to 50 color classes. Each class includes a range of colors defined by the intensities of the red, green and blue components. Once color quantification has been performed, clusters of pixels with similar color classifications may be determined and shapes identified.

Each similarly colored cluster may also be analyzed for texture. For this purpose, the original RGB values may be used as the results of color quantification may not be accurate enough. Regions or clusters of pixels with similar color classifications may be determined and compared to identify and distinguish the texture of hands from hands on which soap, alcohol or some other chemical has been applied.

A predetermined level of matching between the digitized images and the reference images indicates that effective hand washing or disinfectant spreading has occurred. After executing the algorithm on the digitized optical images of the user, computer 14 creates a report sent through the output. All of these events must be performed in near real-time in order to not hamper employee productivity. The report may or may not be displayed to the user either verbally or visually.

The output can be a written pass/fail report provided to the employer or an audible alert. System 10 can automatically call out the name of the employee when it determines that he or she has failed to wash or disinfect his or her hands or give a simple alarm. For instance if an employee is working at the cash register of a fast food restaurant and then begins working in the food preparation area, the system can call out "John Smith please disinfect your hands." If the user is not an employee, no report need be made, unless desired by management.

The present system and method can be used to monitor hand washing. If the employee is required to disinfect his hands after washing them, this can be monitored also. In addition, the present system and method can be used to monitor a stand alone disinfectant spray system where sinks are not available but disinfectants are desirable, as in the entry or exit of some hospital rooms.

In view of the above, it will be seen that the several objects of the invention are achieved and other advantageous results attained. As various changes could be made in the above system and method without departing from the scope of the invention, it is intended that all matter contained in the above description or shown in the accompanying drawings shall be interpreted as illustrative and not in a limiting sense.

What is claimed is:

1. A system for monitoring hand washing or spreading a disinfectant on a user's hands comprising a soap, detergent or disinfectant dispenser for applying soap, detergent or disinfectant to a user's hands, an optical input device in front of which a user places his or her hands after the dispenser has applied soap, detergent or disinfectant while the user goes through a set of motions of washing or spreading the disinfectant over his or her hands, said input device recording one or more optical images of the user's hands while he or she is going through said set of motions, a device for digitizing each of the optical images into a digitized image, a computer having an input for the digitized image and an output for a report, a set of reference optical images taken of the user or of another person going through a set of motions for effective hand washing or spreading of a disinfectant, said reference optical images digitized into a set of reference digitized images and present in the computer, a pattern recognition algorithm executed in the computer that compares each digitized image of the user's hands with the reference set of digitized images to determine whether the user's images match the reference images to a predetermined level that indicates effective hand washing or disinfectant spreading, and creates a report sent through the output.

2. The system of claim 1 further comprising a device for identifying the user as he or she approaches the soap dispenser.

3. The system of claim 1 wherein the optical input device is a 24-bit RGB video camera and the digitized image is color quantified into 8 to 50 color classes.

4. The system of claim 3 wherein clusters of pixels with similar color classifications are determined and shapes identified.

5. The system of claim 4 wherein the algorithm is a trained pattern recognition algorithm.

6. A method for monitoring hand washing or spreading a disinfectant on a user's hands comprising having a user place his or her hands in front of a soap, detergent or disinfectant dispenser for applying a soap, detergent or disinfectant to the user's hands, having the user place his or her hands in front of an optical input device after the dispenser has applied soap, detergent or disinfectant while the user goes through a set of motions of washing or spreading the disinfectant over his or her hands, said input device recording one or more optical images of the user's hands while he or she is going through said set of motions, digitizing each of the optical images into a digitized image, executing a pattern recognition algorithm in a computer having an input for the digitized image and an output for a report, said computer having a digitized set of reference optical images taken of the user or of another person going through a set of motions for effective hand washing or spreading of a disinfectant, said pattern recognition algorithm comparing each digitized image of the user's hands with the reference set of digitized images to determine whether the user's images match the reference images to a predetermined level that indicates effective hand washing or disinfectant spreading and creating a report sent through the output.

7. The method of claim 6 further comprising identifying the user as he or she approaches the soap, detergent or disinfectant dispenser.

8. The method of claim 6 wherein the optical input device is a 24-bit RGB video camera and the digitized image is color quantified into 8 to 50 color classes.

9. The method of claim 8 wherein clusters of pixels with similar color classifications are determined and shapes identified.

10. The method of claim 9 wherein the algorithm is a trained pattern recognition algorithm.

* * * * *